June 7, 1932. P. CICCONE 1,862,299
CONVERTIBLE HAND TRUCK
Filed Feb. 25, 1930
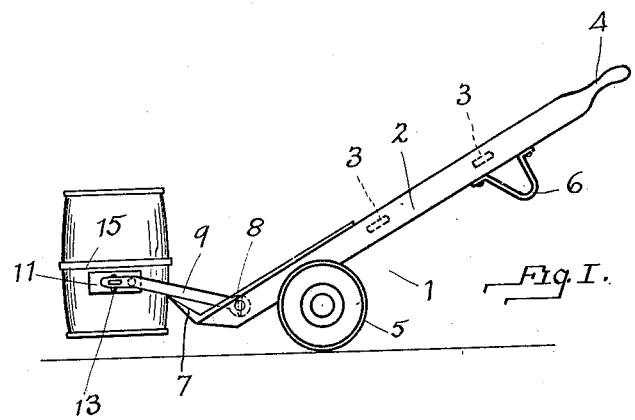
Fig. I.
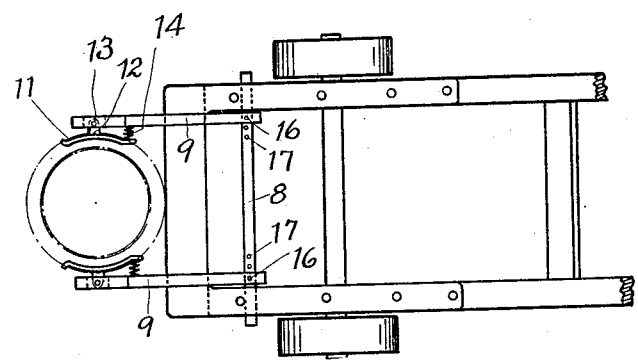
Fig. II.
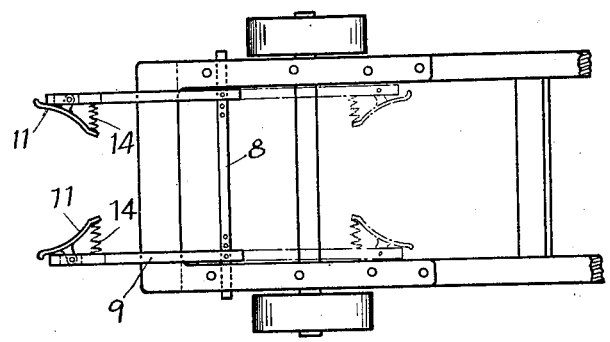
Fig. III.
INVENTOR
Pasquale Ciccone
by Christy Christy and Wharton
his attorneys Patented June 7, 1932

1,862,299

UNITED STATES PATENT OFFICE

PASQUALE CICCONE, OF AMBRIDGE, PENNSYLVANIA

CONVERTIBLE HAND TRUCK

Application filed February 25, 1930. Serial No. 431,261.

This invention relates to a convertible hand truck.

One object of the invention is to provide a hand truck having an attachment which is capable of clamping a keg or barrel for lifting and transporting the same without the necessity for manual operation of the clamping means to engage or disengage the keg or barrel.

Another object of the invention is to so arrange the assembly of the hand truck body, and the keg clamping attachment, that the clamping attachment as a whole may be caused to so lie with respect to the truck body as to adapt the same for the transportation of boxes and other articles on the truck body itself.

Another object is to provide a truck assembly which is simple and inexpensive, and in which the keg and barrel attachment may be applied to hand trucks of simple construction, which may be already in use.

In the accompanying drawing Figure I is a side elevation of the hand truck, showing the position of the assembly in carrying a keg or barrel; Figure II is a plan view of the forward portion of the truck, with the keg carrying attachment in extended, or operative position and a keg engaged thereby; and Figure III is a similar view showing in full lines the keg carrying attachment engaging a keg, and in dotted lines the inoperative, or nested, position of the attachment, to adapt the truck for the transportation of articles on the body thereof.

As is usual in hand trucks, the truck body proper, designated generally by the reference numeral 1, comprises side sills 2, cross members 3 extending therebetween, handles 4, wheels 5 adjacent the forward end of the body, and supporting feet 6 adjacent the rear or handle end of the body. At the forward extremity of the body is a transverse and slightly upturned metallic shoe 7.

The keg carrying attachment of the assembly comprises a transverse shaft 8 rotatably mounted in the side sills 2 of the truck body. To this shaft are rigidly attached arms 9 arranged to extend longitudinally of the truck body. Desirably a bracing rod 10 extends between the arms 9.

The keg engaging means proper comprise curved plates 11, which are each connected to the arms 9 by means of a bracket 12 having a vertically pivoted connection 13. Relatively strong springs 14 acting between the arms 9 and plates 11 exert a force tending to urge the rear ends of the plates inwardly toward each other. The plates thus normally lie in angularly disposed position to embrace a keg or barrel, when the arms 9 are in their extended or operative position.

To engage a keg or barrel, the arms 9 are swung into their inoperative position. The truck is then tilted forwardly so that the plates 11 extend below the transverse central line or belly 15 of the keg, and the truck is pushed forwardly sharply so that the plates embrace the keg. When the plates are in proper position with respect to the keg, springs 14 serve to force them into close engagement therewith, and to prevent horizontal displacement of the keg from the plates. Forward movement of the truck tends to wedge the keg rearwardly between the plates 11 and to cause the action of springs 14 to grip it more firmly.

In carrying position the arms 9 rest on the edge of the forward shoe 7 of the truck, which is also in contact with the keg. Vertical displacement of the keg is prevented by the bulging contour of the keg itself, and to some extent by the co-operating contact of shoe 7, which tends to prevent rearward swinging of the lower portion of the keg. Obviously the engagement permits the keg to be lifted from a position of rest and carried by the truck and the keg engaging attachment.

To release the keg the hand truck is tilted forwardly from carrying position to bring the keg to a position of rest, and the plates 11 may be disengaged by merely retracting the truck with an abrupt movement. When disengagement is begun the springs 14 tend to exert a releasing rather than an engaging force.

If the truck is to be used for transporting articles other than kegs or barrels, as for example boxes, bags, or the like, arms 9 are swung rearwardly, rotating the shaft 8 until they lie upon cross members 3 in a position parallel to the truck sills 2. In this position of the keg carrying structure it lies below the upper surface of the truck body proper, so that the hand truck may be used for any unspecialized purpose.

Desirably shaft 8 is provided with a plurality of engaging holes 17, to one of which each of the arms 9 is engaged by means of any suitable pin 16. This permits relative lateral adjustment of the arms 9 to accommodate the engaging structure to various sizes of kegs or barrels.

It is to be noted that the device is simple, and that the engagement and disengagement of a keg or barrel does not require actuation of any operating connections; nor are operable locking means necessary in order to retain the keg or barrel during its transportation.

What I claim is:

1. A convertible hand truck comprising a truck body, arms extensible at will forwardly of said truck body, curved keg engaging plates pivotally mounted in said arms, resilient means arranged to act adjacent the rear ends of said plates for urging the rear ends of the plates toward each other, and a stop member mounted at the forward end of the truck in position to support the arms when extended and to contact a keg engaged by the plates on said arms.

2. A convertible hand truck comprising a truck body, arms swingingly mounted on said body to lie within said body or extend forwardly beyond the same, curved keg engaging plates pivotally mounted in said arms, resilient means arranged to exert a force for urging the rear ends of the plates toward each other, and a stop member mounted at the forward end of the truck in position to support the arms when extended and to contact a keg engaged in the plates of said arms.

3. A convertible hand truck comprising a truck body, arms extensible at will forwardly of said truck body from retracted position within said truck body, keg-engaging means on said arms comprising members normally in position to receive a keg and resilient means acting on said members to maintain the members in contact with a keg received by them, and a stop member mounted at the forward end of the truck body in position to support the arms when extended and to contact a keg engaged by the keg-engaging means on said arms.

In testimony whereof I have hereunto set my hand.

PASQUALE CICCONE.